UNITED STATES PATENT OFFICE.

GEORGE T. LEWIS, OF PHILADELPHIA, PENNSYLVANIA.

IMPROVEMENT IN REFINING AND WHITENING THE PRODUCT FROM ORES OF LEAD AND ZINC.

Specification forming part of Letters Patent No. 112,607, dated March 14, 1871.

*To all whom it may concern:*

Be it known that I, GEORGE T. LEWIS, of the city and county of Philadelphia, in the State of Pennsylvania, have invented a new and useful Process of Refining and Whitening the Products of the Sulphurets of Lead and Sulphurets of Zinc, which invention is supplementary to the treatment of sulphurets of zinc and lead (either as single sulphurets or as mixed sulphurets) with fuel and a dust-blast, for the purpose of obtaining lead-white, zinc-white, or lead and zinc white by collecting the products in a bag, room or otherwise; and I do hereby declare the following to be a full, clear, and exact description of my said invention, which will enable others skilled in the art to which it appertains to practice the same.

The nature of my said invention consists in submitting the products of the sulphuret ores of lead and zinc, as aforesaid, to the action of highly-heated air. I cause the products obtained from the bag-room or other collecting-chamber to be placed in or to pass through a chamber or passage, along which I drive from a blower or other means of blast a current of highly-heated air, which is made to pass into, among, and through the products obtained from the bag room, as aforesaid. The effect of this is to whiten and refine the product. I prefer to heat the air to a moderate or low red heat.

What I claim as my invention, and desire to secure by Letters Patent of the United States, is—

The process of refining and whitening of the product obtained by reducing the sulphurets of lead and zinc with fuel by subjecting it to the action of a highly-heated current of air, as above described.

GEORGE T. LEWIS.

Witnesses:
WM. R. WRIGHT,
CHAS. M. GREER.